Feb. 21, 1928.
J. SCHLOTHAN
BOX PILING TRUCK
Filed April 7, 1927
1,660,016
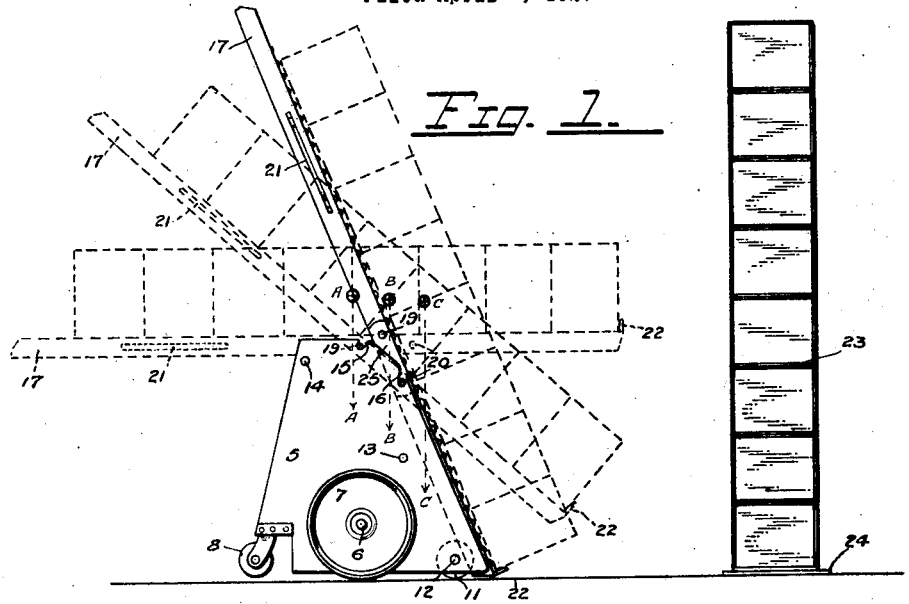
Fig. 1.
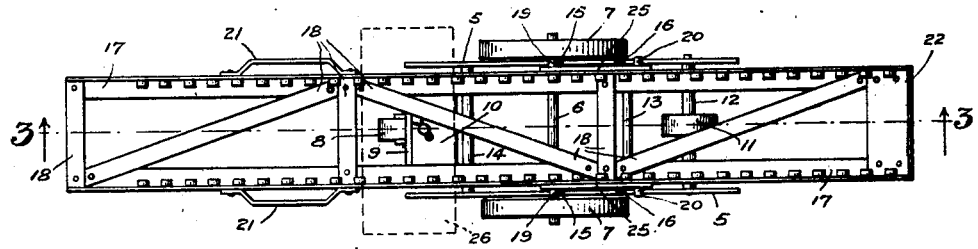
Fig. 2.
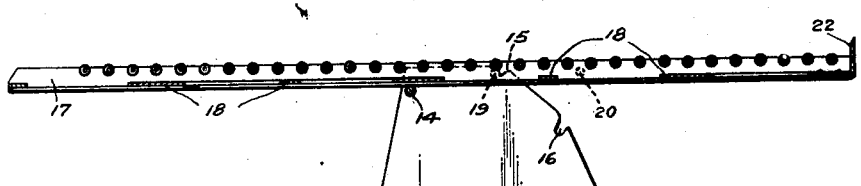
Fig. 3.
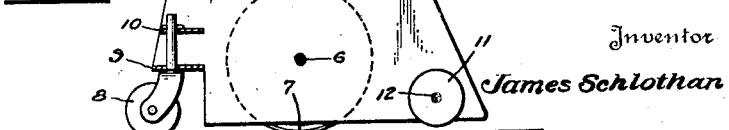
Inventor
James Schlothan
By John W. Maupin
Attorney Patented Feb. 21, 1928.

1,660,016

UNITED STATES PATENT OFFICE.

JAMES SCHLOTHAN, OF KETCHIKAN, TERRITORY OF ALASKA.

BOX-PILING TRUCK.

Application filed April 7, 1927. Serial No. 181,847.

My invention relates to box piling trucks and certain objects of the invention are to provide a truck whereby as many as seven, eight or nine boxes of goods may be readily and easily moved from place to place and piled or stacked at one time by one man. Further objects are to provide a truck having a double pivotal movement so that the roller body which carries the load will swing easily and lightly to the floor and back again to a horizontal position. Still further objects are to provide a truck that is simple and durable in construction, reliable and efficient in operation, that may be easily guided in its movements and which may be readily manipulated for engagement with or disengagement from the load.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:—

Figure 1 is a view in side elevation of the truck showing the roller body in several positions and also showing a pile of boxes stacked in position for engagement by the roller body;

Fig. 2 is a top plan view of the truck on a slightly enlarged scale; and

Fig. 3 is a view in central longitudinal vertical section taken substantially on a broken line 3, 3 of Fig. 2.

Referring to the drawings throughout which like reference numerals designate like parts, the numeral 5 indicates the two sides of the truck carriage disposed in spaced relation and provided with an axle 6 on which are mounted relatively large wheels 7. A swivel wheel 8 is pivotally mounted in spaced plates 9 and 10 whereby the truck may be guided with ease in its movements. A forward wheel 11 is mounted on an axle 12. Ordinarily the wheels 7 and 8 carry the load and the forward wheel 11 is normally raised slightly above the floor as shown in Fig. 3 of the drawings.

A transverse rod 13 serves to retain the mid portion of the carriage sides 5 in spaced relation and a rest rod 14 retains the upper portion of said sides in spaced relation. Each of the carriage sides is provided with a slot 15 disposed in its upper central edge portion substantially at points vertically above the axle 6. Two other transversely aligned slots 16 are provided in the forward inclined edges of said carriage sides at points a short distance forward and below the slots 15.

The roller body comprises two side members 17 preferably made of angle iron and held apart in parallel spaced relation by a plurality of braces 18. Two oppositely disposed pins 19 are secured to the sides 17 at points slightly forward of the center of gravity of the roller body so that when said pins rest in the slots 15 the body will assume a horizontal position and be supported in such position by the rest rod 14 as clearly shown in Fig. 3.

Two other pins 20 are similarly secured to the body sides 17 at distances forward of the pins 19 equal to the distances between the slots 15 and 16. It will be obvious that said pins will engage the slots 16 when the roller body is tilted to the intermediate position shown in dotted lines in Fig. 1. In continuing to lower the forward end of the roller body the pins 19 will leave the slots 15 and said body will be solely supported by the pins 20 pivotally bearing in the slots 16 as will be readily understood.

The shifting of the pivotal support of the roller body from the pins 19 to the pins 20 will cause the forward end of said body to descend lightly to the floor. Said body may be pivotally manipulated by grasping the handles 21 secured to either side thereof. A lip 22 is secured to the forward end of the body for insertion under the boxes when it is desired to move a standing stack as designated by the numeral 23 in Fig. 1. In this case it is usually necessary to have the boxes piled on two slats or laths, as indicated at 24, so the lip may enter freely thereunder. In the completely lowered position of the roller body for loading or unloading a stack of boxes the entire carriage will tilt forward with the forward wheel 11 in engagement with the floor and the rear swivel wheel 8 raised slightly above the floor as shown in Fig. 1.

My device is particularly adapted for use in canneries for moving boxed goods such as canned salmon, milk, fruit, vegetables and the like. Referring to the different positions of the roller body illustrated in Fig. 1, it will be observed that in lowering said body the center of gravity of the load will shift forward from a position assumed to be at a point designated by the letter A in the dotted horizontal position that is slightly to the rear of the pivots 19 to a point designated by B in the intermediate dotted position, and finally to a point C in the completely lowered position that is forward of the pivots 20. With a single pivotal support such as the pins 19 this shifting forward of the center of gravity would cause the load to descend abruptly to the floor and for this reason I have provided the additional pivotal supports 20 to equalize the load and cause same to descend lightly to the floor and also back to the horizontal position. It will be understood that additional pivotal supports could be provided if desired notwithstanding the fact that I have found the two sets of pivots sufficient to accomplish the desired results.

The device shown in the drawings is designed to carry eight boxes and it will be understood that same may be constructed to carry seven, nine, or any other desired number by changing the length of the roller body and the positions of the pivotal supports. It would be possible to accomplish this result by simply shifting both sets of pivots back or forth, as the case may be, an equal amount. The pivot pins 19 and 20 are shown as integral parts of plates 25 that may be bolted to either side of said roller body and it would be a comparatively simple matter to shift said plates either forward or backward a predetermined distance.

In the completely lowered position shown in full lines in Fig. 1 the roller body will be inclined at an angle of substantially twenty-three degrees with the vertical from which position one man may readily tilt the stack of boxes onto the body when loading, and likewise straighten same to a vertical position when unloading. The entire width of the truck should be slightly narrower than the lengths of the boxes that are handled, as may be seen by reference to the box shown in dotted lines at 26 in Fig. 2 so that same may be wheeled in between two rows or piles of boxes for loading or unloading.

A very important function of my device is in the use of same for removing boxes from roller tracks that are ordinarily installed in canneries several feet above the flooring. In such usage the end of the roller body is engaged into the end of the roller track. The boxes are rolled along said roller track, turned on their narrow sides or edges, and the desired number is rolled onto the roller body which is then disengaged from the track and with its load is wheeled to the place where the boxes are to be piled as will be readily understood.

Having thus described my invention, it being understood that minor changes may be resorted to therein without departing from its scope and spirit, what I claim and desire to secure by Letters Patent of the United States is:—

A box piling truck comprising a carriage having a pair of sides disposed in spaced relation, a pair of relatively large wheels centrally disposed in the lower portion of the carriage, a swivel wheel for the rear of the carriage, a forward wheel normally out of engagement with the floor, the sides of the carriage having a pair of transversely aligned slots disposed in their upper central edge portions, said sides having a second pair of slots disposed forward and below the first pair, a roller body, a pair of pivot pins secured to the sides of said body slightly forward of its center of gravity arranged to normally rest in the first named pair of slots, a second pair of pivot pins for the body forward of the first named pair arranged to engage the second named pair of slots in support of the body when its forward end is swung downwardly, a rest rod for retaining the body in a horizontal position, handles for the rear body portion, a lip for the forward end of the body, and the forward wheel adapted to engage the floor when the roller body is swung downwardly.

In witness whereof, I hereunto subscribe my name this 28th day of February A. D. 1927.

JAMES SCHLOTHAN.